United States Patent [19]

Lloyd

[11] Patent Number: 4,875,953

[45] Date of Patent: Oct. 24, 1989

[54] IMPRESSION PRINTING PROCESS FOR ANIMALS AND CHILDREN

[76] Inventor: Christopher A. Lloyd, P.O. Box 59, Twin Peaks, Calif. 92391

[21] Appl. No.: 278,672

[22] Filed: Nov. 30, 1988

[51] Int. Cl.[4] .......................... B32B 31/00; B44C 1/17

[52] U.S. Cl. ...................................... 156/62; 156/234; 156/249; 434/84; 434/410

[58] Field of Search ............... 156/230, 231, 234, 239, 156/241, 249, 62, 277; 434/84, 98, 162, 326, 410; 101/33, 34

[56] References Cited

U.S. PATENT DOCUMENTS

| | | | |
|---|---|---|---|
| 3,397,468 | 8/1968 | Cole | 434/410 |
| 3,597,099 | 8/1971 | Tollin | 434/84 |
| 3,802,904 | 4/1974 | Morrison | 434/84 |
| 4,328,051 | 5/1982 | Robinette | 156/62 |
| 4,550,679 | 11/1985 | Pipa et al. | 434/84 |
| 4,801,266 | 1/1989 | Kinberg | 434/410 |

*Primary Examiner*—Michael W. Ball

*Assistant Examiner*—Louis Falasco

[57] ABSTRACT

A process whereby an animal or child can create a unique impression print without coming into contact with the printing medium. A non-toxic acrylic paint 8 is applied to a plywood paint board 10. Next an artist canvass 14 is placed face down and supported upon the four supports 12 mounted on the paint board 10. The support system holds the artist canvass 14 in place and provides a means of maintaining a physical separation between the painted paint board 10 and the artist canvass 14. The animal or child is then allowed to walk, run, play, eat or whatever on the back-side of the artist canvass 14. The weight of the animal or child causes the artist canvass 14 to stretch and touch the painted paint board 10 thereby transferring a unique impression print to the artist canvass 14. The process can be repeated any number of times to add more colors or more prints. Thus the animal or child can create a unique impression print without coming into contact with the printing medium.

10 Claims, 3 Drawing Sheets

IMPRESSION PRINTING PROCESS FOR ANIMALS AND CHILDREN

FIELD OF INVENTION

This invention relates to an impression printing process; specifically to a process whereby an animal or child can create a unique impression print without coming into contact with the printing medium.

BACKGROUND

The significant problem which this process solves is that the animal or child does not have to come into contact with the printing medium to create a print.

When I first came up with the idea of a painting or print created by an animal or child, I placed my girlfriend's cat in a bucket of red paint and let it run around on a big sheet of paper. That produced some great prints, however, the cat decided to make a run for it and that meant red paint went everywhere. Needless to say, I was banned from experimenting with the cat again. I still felt strongly that pet owners and parents alike would really enjoy a print made by their pet or child respectively, if the mess and clean up could be eliminated by not having to touch the printing medium. Hence the development of this invention.

OBJECTS AND ADVANTAGES

The following are objects and advantages of the invention: to provide a process whereby an animal or child can create a unique impression print without coming into contact with the printing medium; to provide a safe, easy and fun to use method of creating a lasting memory; to provide a novel way for an animal or child to create a piece of art. Further objects and advantages of the invention will be found from a consideration of the following description and the accompanying drawings.

DRAWING FIGURES

Figure 1:
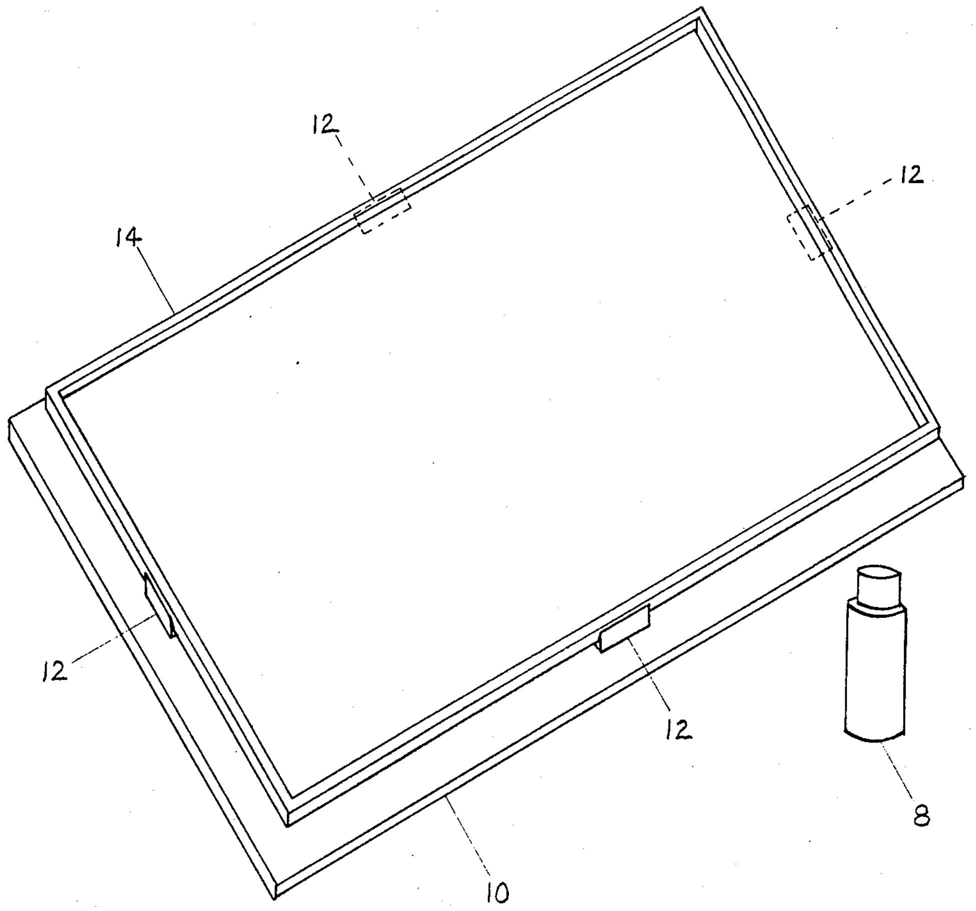
FIG. 1 shows a perspective view of the apparatus used in my invention.

DRAWING REFERENCE NUMERALS 10 paint board
8 NON-TOXIC ACRYLIC PAINT
12 support
14 artist canvass

SUMMARY OF THE INVENTION

Figure 2:
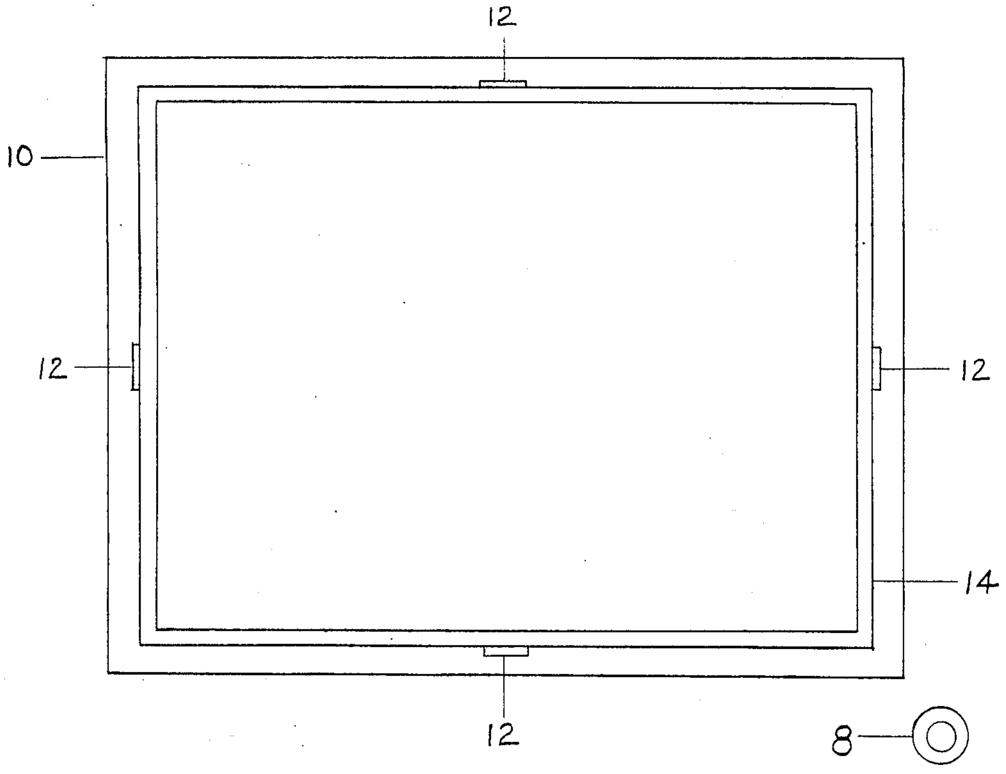
FIG. 2 shows a top view of the apparatus used in my invention.
Figure 3:
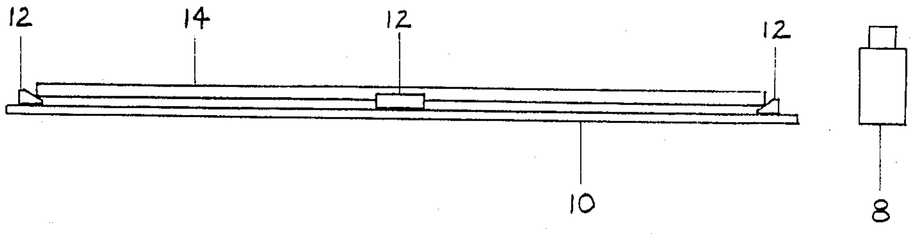
FIG. 3 shows a side view of the apparatus used in my invention.

FIG. 1, 2 and 3 show the various views of the preferred physical structure o the apparatus used in my invention. The apparatus comprises a means capable of bearing the printing medium preferably chosen to be a paint board 10 which is preferably made of ½ inch stop grade (ACX) plywood with preferred dimensions of 20 by 26 inches. Mounted on the paint board 10 are the four supports 12 of the support system. Each support 12 is preferably 1½ inch in length and made of ½ inch wooden cove trim material and is mounted approximately 1 inch in from the edge of the paint board 10. The supports 12 are preferably mounted with super glue. Resting face down on the supports 12 is a flexible means capable of receiving the printing medium preferably chosen to be an artist canvass 14 with preferred dimensions of 18 by 24 inches.

DESCRIPTION OF THE PREFERRED EMBODIMENT

The operation of this invention is very simple. First a printing medium, preferably a non-toxic acrylic paint 8 is applied to the middle of the pant board 10 anywhere between the four supports 12. The paint can be applied using a flat spreader, roller, brush or merely poured onto the paint board 10. Next the artist canvass 14 is placed face down and supported upon the four supports 12. The support system holds the artist canvass 14 in place and provides a means of maintaining a physical separation of preferably 1/8 inch between the now painted paint board 10 and the artist canvass 14. The animal or child is then allowed to walk, run, play, eat or whatever on the back-side of the artist canvass 14. The weight of the animal or child causes the artist canvass 14 to stretch and touch the painted paint board 10 thereby transferring a uinque impression print to the artist canvass 14. The process can be repeated any number of times to add more colors or more prints. Thus the animal or child can create a unique impression print without coming into contact with the printing medium.

In addition to creating a print using part of the body, e.g., paws or feet, anything else with sufficient weight to stretch the artist canvass 14 can be used. For example a child might play with a toy truck on the back-side of the artist canvass 14 thereby transferring an impression print of the truck's tires to the artist canvass 14.

CONCLUSION, RAMIFICATIONS AND SCOPE OF INVENTION

While the above description contains many specificities, they should not be considered as limitations on the scope of the invention but merely as the preferred physical structure of the apparatus used in the invention. Others will be able to envision many other possible variations which are within the overall scope of the invention. For example the dimensions and shapes can be readily modified. This could be done to accomodate various sizes and weights of animals and children. The materials can also easily be varied, e.g., the paint board 10 could be made of plastic or another suitable material; the artist canvass 14 could be varied to a paper product or a different type of fabric material; the supports 12 could be changed to plastic. In addition, the supports 12 could be modified to include a means of "locking" the artist canvass 14 in place. This could be accomplished by including a latching device on the supports, an arrangement of the supports which allows the artist canvass 14 to "snap" into place, or simply the use of velcro tabs on both the supports and the artist canvass 14. The support system could also be modified to accomodate various sizes of the artist canvass 14. This could be accomplished by attaching a small dowel to the bottom of each support 12. Four dowel support holes per various size of the artist canvass 14 could then be drilled in the paint board 10. Thus the dowel supports could be easily moved to accomodate various sizes of the artist canvass 14. The support system could also be modified to vary the separation distance between the paint board 10 and the artist canvass 14. Also the supports 12 could be attached to the artist canvass 14 rather than the paint board 10. Further, the printing medium itself could be varied from the preferred non-toxic acrylic paint 8. For example the paint and paint board 10 could be eliminated altogether with the substitution of a large ink pad. Accordingly, the scope of the invention should not be limited by the physical structure of the apparatus illustrated in the invention, but by the appended claims and their legal equivalents.

I claim:

1. A process of transferring a printing medium from a printing medium coated member to a flexible recieving substrate whereby an animal or child can create a unique impression print without coming into contact with the printing medium, comprising the following steps:

(a) coating a member with a printing medium;

(b) providing said flexible recieving substrate physically separated from the printing coated member by a supporting means comprising a frame, to maintain a physical separation between said recieving substrate and said printing coated member;

(c) selectively pressing areas of said flexible recieving substrate to stretch it and bring the substrate into print medium transfer contact with said printing coated member to transfer the printing medium in the areas to said receiving substrate.

2. The process of claim 14 wherein said printing medium is a nontoxic medium.

3. The process of claim 2 wherein said non-toxic medium is a non-toxic paint.

4. The process of claim 3 wherein said non-toxic paint is a nontoxic acrylic paint.

5. The process of claim 1 wherein said flexible relieving substrate is an artist canvass.

6. The process of claim 1 wherein said coated member a rigid member.

7. The process of claim 6 wherein said rigid member is made of plywood.

8. The process of claim 1 wherein said support means includes a plurality of support members.

9. The process of claim 8 wherein said plurality of support members are of equal length.

10. The process of claim 9 wherein said plurality of support members of equal length are made of ½ inch wooden cove trim.

* * * * *